Jan. 14, 1941.   F. B. THOMSON   2,228,738
SEAL
Filed June 29, 1939
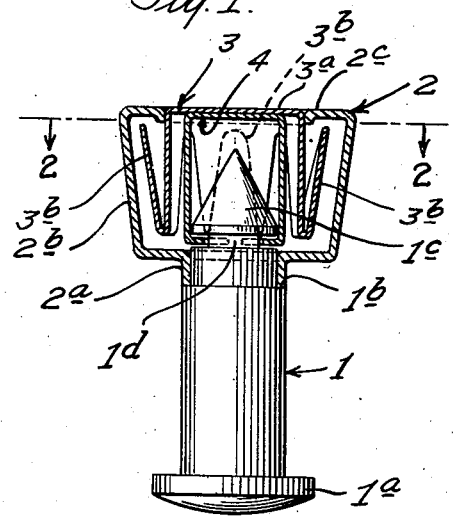
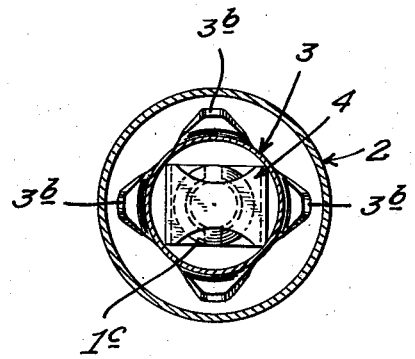
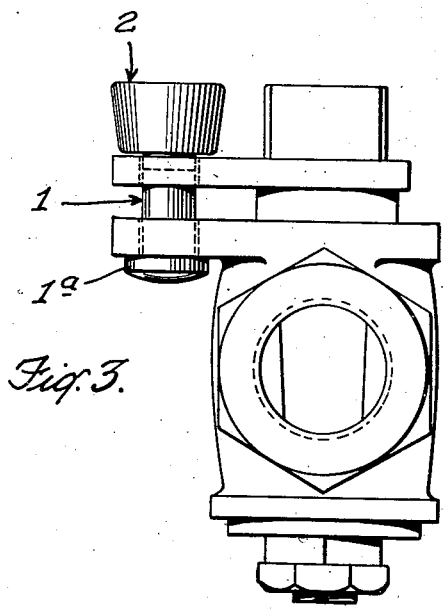
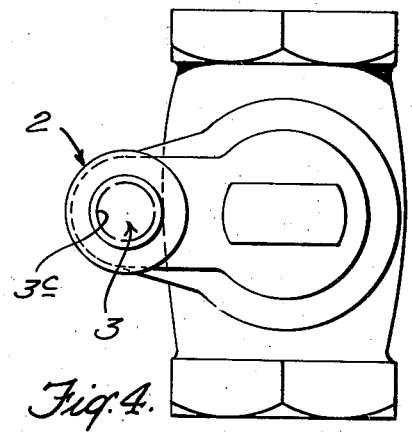
INVENTOR
Frederick B. Thomson
BY George F. Gill
ATTORNEY Patented Jan. 14, 1941

2,228,738

UNITED STATES PATENT OFFICE 2,228,738

SEAL

Frederick B. Thomson, Teaneck, N. J., assignor to Metropolitan Device Corporation, Brooklyn, N. Y., a corporation of New York Application June 29, 1939, Serial No. 281,769

9 Claims. (Cl. 292—327)

When service, such as electric, gas or water service, is suspended, it has been found to be desirable to provide some means of locking and sealing the entrance switch or valve. Various forms of latching and sealing arrangements have been devised and used for locking and sealing electric switches. On entrance valves, particularly gas cocks, lugs are commonly provided having openings therethrough. One lug is formed on the valve casing and the other on the valve. When the openings through these lugs are alined axially, the valve is closed. Usually upon the suspension of service, the valve is closed and a padlock is used to lock the valve in the closed position, the bail of the padlock passing through the openings through the lugs.

Padlocks are, however, unsatisfactory for this purpose. They may be removed and replaced by unauthorized persons without leaving readily observable evidence of the fact that they have been tampered with. Various forms of sealing arrangements have been suggested to replace the padlock but none has been found to be entirely satisfactory.

An object of the invention herein disclosed is to provide a seal for preventing relative movement of two relatively movable parts such, for example, as the elements of a valve. Another object of the invention is to provide such a seal that is readily put in place and removed by authorized persons. A further object of the invention is to provide a seal of this kind that cannot be removed without leaving readily observable evidence of the fact that it was removed. Another object of the invention is to provide a seal of this kind that is comparatively inexpensive to manufacture and use.

The foregoing and other objects and certain advantages that will hereinafter appear are realized in the seal embodying the invention and illustrated in the accompanying drawing in which:

Fig. 1 is a longitudinal sectional elevation of the seal;

Fig. 2 is a transverse section of the same taken on the line 2—2 of Fig. 1;

Fig. 3 is a side elevation of a gas cock with the seal applied thereto; and

Fig. 4 is a plan of the same.

Essentially, the seal illustrated in the drawing comprises a shank and a head. The shank is a strong metal shank and of such length as to pass through the alined openings of the lugs of a gas cock for example. The head engages the shank in such manner that the engaging means are completely enclosed. The head can, therefore, be removed from the shank only by destroying some part of the seal.

The particular seal illustrated in the drawing includes a shank 1 that has a flanged end 1a which engages the surface surrounding an opening through which the shank extends. Near the opposite end, the shank is reduced in diameter forming a radial, circumferential shoulder or ledge 1b. The end of this reduced portion of the shank is tapered to form a conical end portion 1c on the shank. At the base of the conical end portion 1c there is formed a radial groove 1d. This groove constitutes a retaining groove and the radial side wall at the base of the conical end portion 1c constitutes a shoulder that is engaged by a head retaining element.

A head assembly serves to form a removable head on the reduced end of the shank and so hold the shank within an opening through which the shank extends. The particular head assembly illustrated in the drawing includes a hollow head 2. This head is made from a single piece of metal and includes a skirt or collar 2a that has an external diameter substantially the same as the external diameter of the ledge 1b formed on the shank. The thickness of the metal of the skirt is approximately equal, or slightly less, than the width of the ledge 1b. The reduced portion of the shank enters the skirt 2a and the skirt is of such length that the groove 1d in the shank extends slightly beyond the skirt 2a.

At the end of the skirt 2a the head is enlarged forming the body portion 2b of the head. This body portion is frustro conical, the part of smaller diameter being adjacent the skirt. At the enlarged end of the body portion there is formed an inwardly extending, radial, flange 2c, the inner edge of which is spun inwardly in an axial direction.

Within the head there is a cap 3, the end 3a of which closes the opening into the head at the larger end of the head. A series of resilient prongs 3b formed on the cap are bent upon themselves and the ends thereof engage the inner surface of the flange 2c to prevent removal of the cap. The prongs have a certain amount of resiliency and when the cap is forced into the open end of the head they spread and so engage the under surface of the flange 2c. The length of the cap is such that it cannot be pressed in to provide access to the interior of the head. The end of the cap is scarfed as indicated at 3c to render the end of the cap readily destrucible to provide ready access to authorized persons.

Within the cup 3, there is a resilient element 4. This element may take various forms and arrangements and may be formed as an integral part of the cap. Its function is to engage in the groove 1d of the shank and retain the head on the shank. The particular resilient element 4 shown in the drawing is a spring that consists of a single strip of resilient metal bent substantially in the form of a square. The free ends of the strip which form one end of the element are notched to accommodate the neck at the base of the groove 1d. These end sections are received within the groove 1d and engage the side of the groove to hold the head on the shank. The spring element also engages the radial section of the head at the end of the skirt 2a. The head is thus securely locked on the shank.

In practice, the head is assembled ready for use. The spring is placed in the cap and the cap pressed into the head. When it is desired to cut off service, as for example, gas service, the gas cock is turned to bring the openings through the lugs into alinement as illustrated in Figs. 3 and 4. The shank 1 is inserted through the alined openings and the head pressed over the end of the shank until the edge of the skirt 2a engages the ledge 1b. The conical end of the shank spreads the spring 4 as the head is pressed on the shank and so expands the spring. As the spring passes over the conical portion it snaps into the groove 1d.

When it is desired to remove the seal, the cap is torn, the scarfing rendering this easy of accomplishment. Thus the end of the cap is removed and access is provided to the interior of the head. Through the opening thus provided the spring may be expanded and the head released and removed. It will be observed that access to the locking spring can only be had by destroying the cap and if the gas cock seal be tampered with unmistakable and readily observable evidence of the fact appears.

It will be obvious that various changes may be made by those skilled in the art in the details of the embodiment of the invention illustrated in the drawing within the principle and scope of the invention as expressed in the appended claims.

I claim:

1. A seal of the type described comprising in combination a shank having a shoulder thereon at one end thereof, a hollow head for the shank arranged to receive the shoulder, and means for securing the head on the shank including a resilient element within the head for engaging the shoulder formed on the shank and a destructible cover therefor arranged to close the end of the head and render the resilient element inaccessible and means within the head for retaining the cover in place.

2. A seal of the type described comprising in combination a shank having a shoulder thereon at one end thereof, a hollow open-ended head for the shank arranged to receive the shoulder, and means for securing the head on the shank including a resilient element within the head for engaging the shoulder formed on the shank and a destructible cover therefor associated therewith and arranged to close the end of the head and render the resilient element inaccessible, and means associated with the cover within the head for retaining the cover in place.

3. A seal of the type described comprising in combination a shank having a shoulder thereon at one end thereof, a hollow open-ended head for the shank arranged to receive the shoulder, a cap having a destructible end portion for closing the end of the head, means associated with said cap within the head for retaining the cap in the head, and a resilient element within the head for engaging the shoulder on the shank and retaining the head on the shank.

4. A seal of the type described comprising in combination a shank having a shoulder thereon at one end thereof, a hollow open-ended head for the shank arranged to receive the shoulder, a cap having a destructible end portion for closing the end of the head, means associated with said cap within the head for retaining the cap in the head, and a resilient element associated with the cap and within the head for engaging the shoulder on the shank and retaining the head on the shank.

5. A seal of the type described comprising in combination a shank having a shoulder thereon at one end thereof, a hollow open-ended head for the shank arranged to receive the shoulder, a cap having a destructible end portion for closing the end of the head, means associated with said cap within the head for retaining the cap in the head, and a resilient element within the cap for engaging the head and the shoulder on the shank and retaining the head on the shank.

6. A seal of the type described comprising in combination a shank having a shoulder thereon at one end thereof, a hollow open-ended frustro-conical head for the shank arranged to receive the shoulder on the shank and having an inwardly extending flange at the larger end thereof, a cap having a destructible end portion for closing the larger end of the head and means associated with the cap engaging the inner side of said inwardly extending flange, and a spring element associated with the cap for engaging the shoulder on the shank and retaining the head on the shank.

7. A seal of the type described comprising in combination a shank having a shoulder thereon at one end thereof, a hollow open-ended frustro-conical head for the shank arranged to receive the shoulder on the shank and having an inwardly extending flange at the larger end thereof, a cap having a destructible end portion for closing the larger end of the head and means associated with the cap engaging the inner side of said inwardly extending flange, and a spring element mounted in the cap and arranged to engage the shoulder on the shank and retain the head on the shank.

8. A seal of the type described comprising in combination a shank having a tapered end section and a groove at the base of the taper, a hollow open-ended, frustro-conical head for the shank arranged to overlie the groove in the shank and having an inwardly extending flange at the larger end thereof, a cap having a destructible end portion for closing the larger end of the head and means associated with the cap engaging the inner side of said inwardly extending flange, and a spring element mounted in the cap and arranged to engage in the groove in the shank and retain the head on the shank.

9. For a seal that includes a shank having a shoulder thereon at one end thereof, a head for the shank comprising in combination a hollow metal case arranged to receive the shoulder, and means for securing the head on the shank including a resilient element within the head for engaging the shoulder formed on the shank and a destructible cover therefor arranged to close the end of the head and render the resilient element inaccessible and means within the head for retaining the cover in place.

FREDERICK B. THOMSON.